(12) United States Patent
Paskach et al.

(10) Patent No.: US 9,353,321 B2
(45) Date of Patent: May 31, 2016

(54) METHOD AND APPARATUS FOR REDUCTION OF TAR IN GASIFICATION OF CARBONACEOUS MATERIALS

(75) Inventors: Thomas J Paskach, Ames, IA (US); Jerod Smeenk, Ames, IA (US)

(73) Assignee: FRONTLINE BIOENERGY, LLC, Ames, IA (US)

( * ) Notice: Subject to any disclaimer, the term of this patent is extended or adjusted under 35 U.S.C. 154(b) by 0 days.

(21) Appl. No.: 14/390,307

(22) PCT Filed: Apr. 3, 2012

(86) PCT No.: PCT/US2012/000184
§ 371 (c)(1),
(2), (4) Date: Oct. 2, 2014

(87) PCT Pub. No.: WO2013/151522
PCT Pub. Date: Oct. 10, 2013

(65) Prior Publication Data
US 2015/0083971 A1 Mar. 26, 2015

(51) Int. Cl.
| | |
|---|---|
| *C01B 3/02* | (2006.01) |
| *C10J 3/22* | (2006.01) |
| *C10J 3/08* | (2006.01) |
| *C10J 3/56* | (2006.01) |
| *C10J 3/72* | (2006.01) |
| *C10K 3/00* | (2006.01) |

(52) U.S. Cl.
CPC ... *C10J 3/08* (2013.01); *C01B 3/02* (2013.01); *C10J 3/22* (2013.01); *C10J 3/56* (2013.01); *C10J 3/721* (2013.01); *C10K 3/005* (2013.01); *C10K 3/008* (2013.01); *C10J 2300/1628* (2013.01); *C10J 2300/1634* (2013.01); *C10J 2300/1807* (2013.01); *C10J 2300/1846* (2013.01)

(58) Field of Classification Search
CPC ............ B01D 53/00; C10J 3/00; C10J 3/466; C10J 3/463; C10J 2300/0959; C10J 2300/0946; C10J 3/721; C10J 2300/1846; C10J 2300/1628; C10J 3/56; C10J 3/08; C10J 3/22; C10J 2300/1634; C10J 2300/1807; C10K 3/005; C10K 3/008; C01B 3/02
See application file for complete search history.

(56) References Cited

U.S. PATENT DOCUMENTS

2011/0277639 A1* 11/2011 Reardon et al. ................. 96/150
2011/0308155 A1* 12/2011 Paskach et al. ................... 48/77

* cited by examiner

*Primary Examiner* — Stanley Silverman
*Assistant Examiner* — Syed Iqbal
(74) *Attorney, Agent, or Firm* — Camille L. Urban; David M. Breiner

(57) ABSTRACT

A method and assembly for producing substantially tar free product gas from gasification of carbonaceous material. The assembly preferably includes a first stage gasifier to produce char-ash and tar laden product gas and a second stage gasifier which has a char-ash heating zone, at least one cyclone, and at least one standpipe for the purpose of allowing selective delivery of char-ash to the char-ash heating zone. A char-ash heating zone that utilizes oxidation of char-ash is preferred and this results in the heat required to convert tar, additional yield of product gas, and an oxidized, activated carbon surface to facilitate tar conversion in the riser, thereby reducing the temperature required to achieve the desired tar conversion. Alternatively, external heat is supplied to the heating zone.

13 Claims, 5 Drawing Sheets

Figure 1:
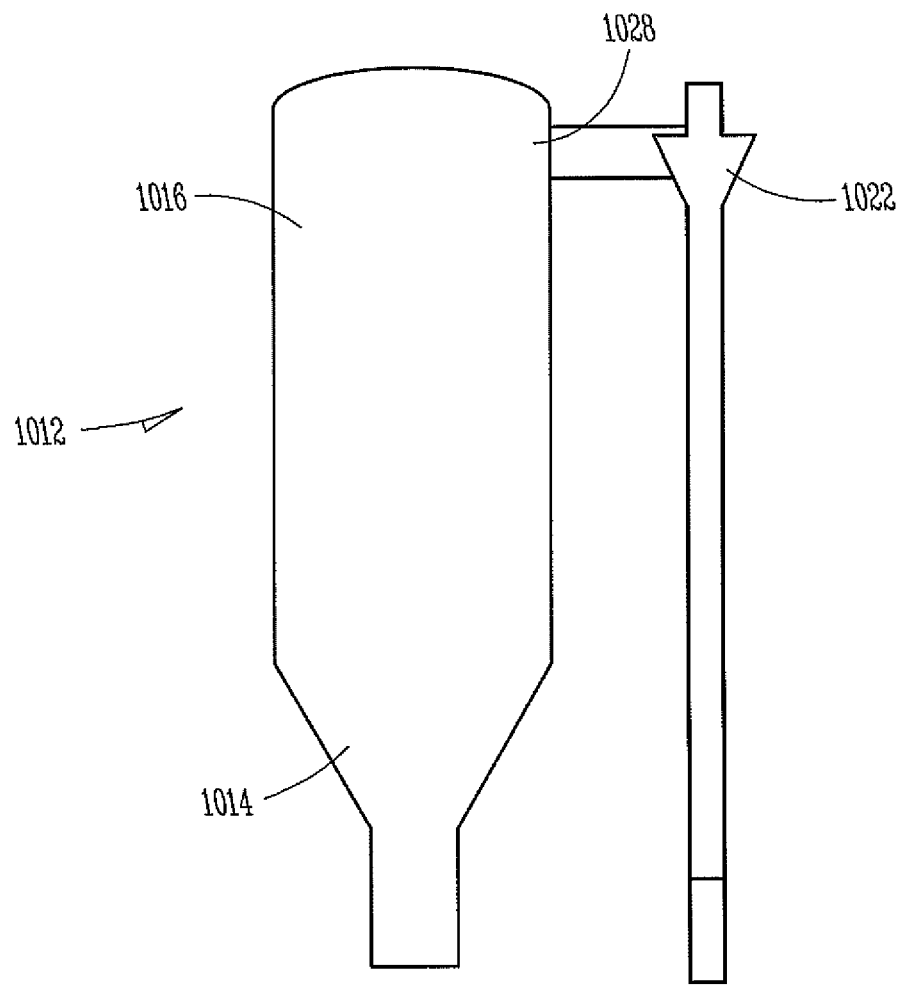

METHOD AND APPARATUS FOR REDUCTION OF TAR IN GASIFICATION OF CARBONACEOUS MATERIALS

FIELD OF INVENTION

The present invention generally relates to the field of processes and apparatus for converting carbonaceous materials such as biomass, waste, coal, organic materials etc. to product gas which is one of either producer gas, typically obtained from air-blown gasification, or syngas, typically obtained from indirect or oxygen-blown gasification that is essentially free of tar or tar forming compounds and wherein carbon conversion and yield of product gas in increased.

BACKGROUND

When carbonaceous materials are heated during a gasification process, gaseous species of varying molecular weights are released as product gas. Production of product gas via gasification of renewable resources has been a focus for researchers for decades. For this purpose, carbonaceous materials include but are not limited to biomass, waste, coal, etc.

Product gas as used herein is a mixture of hydrogen ($H_2$), carbon monoxide (CO) and other combustible and non-combustible gases whereas the hydrogen and carbon monoxide concentrations are maximized, and can be considered as either a fuel gas where it is typically burned directly as fuel to produce heat and/or electric power or as an intermediate for multiple uses, such as synthesis of liquid fuels, chemicals, or other materials.

Carbonaceous species in product gas with molecular weights greater than benzene (MW=78) are generally classified as tars. As initially produced, these tars are reactive or problematic due to their chemical functional groups including but not limited to: hydroxyls, aldehydes, ketones, carboxylic acids, alkenes, alkynes, heterocyclic structures, in any combination, which can allow them to polymerize and thereby cause plugging, form coke or other solid deposits, cause equipment to seize, or have other deleterious effects. The presence of these reactive or problematic tars in product gas has plagued most gasification projects and has been the Achilles heel of gasification.

Capital needs for conversion of carbonaceous materials to product gas are substantial and available processes and equipment still leave much to be desired by way of efficiency of production and ease of operation and maintenance. Although the process of gasification has been practiced for decades, and many, many gasifier designs have been invented, no gasifier exists that can produce a product gas free of tar at commercial scales appropriate for economically compelling conversion of carbonaceous materials into liquid fuels, electric power, or chemicals.

What was needed was a method and apparatus that performs tar conversion to a large extent, would increase product gas production, and would increase carbon conversion, and could do so under conditions that would prevent melting, slagging, clinkering, or agglomeration of char-ash particles, and can be built at an economically viable scale and cost. As used herein, "tar conversion" or "conversion of tar" means removal, modification, or transformation of chemical functional groups within the tar species, including but not limited to: deoxygenation, hydrogenation, reforming, cracking, depolymerization, or other chemical reactions that result in less problematic tar species and/or lower molecular weight species including gases such as $H_2$ and/or CO.

As is known in the art, Ziad Abu El-Rub, *Biomass Char as an In-situ Catalyst for Tar Removal in Gasification Systems*, PhD thesis dissertation, Twente University, Enschede, The Netherlands, March 2008, char-ash (also known as biochar, char, fly ash, or simply ash) can be used as a catalyst to convert tars produced in the gasification of carbonaceous material. It would be desirable to partially oxidize the residual carbon in the char-ash while avoiding oxidation of hydrogen or other valuable constituents in the product gas to generate additional CO in the product gas, generate enough heat to support/enable endothermic tar conversion reactions, enhance or improve the catalytic activity of the char-ash for tar conversion reactions, and maximize carbon conversion while simultaneously enabling smaller reactor volumes or reduced reactor temperatures, all leading to lower cost and more robust operations.

SUMMARY OF INVENTION

It is the first objective of the present invention to increase product gas yield;

It is a second objective of the present invention to increase the activation of the surface of char-ash in order to increase its catalytic activity;

It is a third objective of the present invention to "hold up" char-ash to increase the ratio of char-ash to product gas in the process and to enhance product gas and -char-ash contacting;

It is a fourth objective of the present invention to provide the heat needed for tar conversion without causing or requiring the oxidation of product gas;

It is a fifth objective to convert tar under conditions where that reaction is favored and under conditions that result in increased yield of product gas;

It is a sixth objective of the present invention to increase carbon conversion but simultaneously control the temperature during carbon partial oxidation by providing an excess of char-ash and multiple opportunities for the partial oxidation of the char-ash; and It is a seventh objective of the present invention to utilize any of multiple oxygen sources including air, enriched oxygen air (mixtures of air and oxygen), or pure oxygen with varying amounts of steam, carbon dioxide, or other gases as reaction constituents and/or ballast.

It is an eighth objective of the present invention to reduce the residence time of tar-laden product gas after it is initially produced in an environment of low char-ash concentration to prevent reactions of tar which may form refractory tars of higher molecular weight.

The present invention comprises a method for converting tars and increasing efficiency of product gas production. The invention provides means to separate and then hold up char-ash from product gas for the purpose of performing tar conversion reactions. The invention also provides a means of increasing product gas yield by partially oxidizing elutriated char-ash to enhance the amount of CO produced while preventing combustion of hydrogen or other desired gases from the product gas.

Many other methods of producing product gas exist and gasifier inventions are almost as numerous as the number of gasifiers built. Gasifiers can generally be classified by how heat is applied to the process—either direct or indirect. Examples of direct gasifiers include fixed bed, fluid bed, or entrained flow. Examples of indirect gasifiers include plasma or allothermal.

Allothermal systems rely on combustion of char-ash in a separate reactor from where the gasification reactions take place in order to produce heat. The heat is then circulated back into the gasifier via some heat transfer medium (usually a granular solid such as sand or granular catalyst material) and char-ash and flue gas from char-ash combustion are removed from the combustion reactor. By employing an allothermal reaction and not allowing char-ash to contact product gas to any great extent, these methods are unable to take advantage of the catalytic effect of char-ash, and the resulting increase in product gas production. Plasma systems rely on electricity to form a plasma arc which provides the energy required to volatilize gases and raise the gaseous mixture to a temperature at which all gases are reduced to low molecular weight. While many plasma gasifiers are able to produce a product gas with low tar content, they suffer from very low thermodynamic efficiency, are difficult to scale up, and are typically very expensive.

Direct gasifiers are also unable to take advantage of the catalytic effect of char-ash without a corresponding destruction of product gas or creating a high temperature zone that leads to ash melting problems previously described, unless, as provided for in the description of the present invention, a zone is provided to separate char-ash from syngas where the partial oxidation of the char-ash can take place without simultaneously combusting product gas.

Methods for managing tar in direct gasifiers often employ high temperatures to thermally convert tar and/or scrubbers/absorbers/condensers, etc. to remove tar. The high temperatures can create melting or softening of ash components and this can create slagging and/or agglomeration which, in turn, requires maintenance and/or specific processes for removal of agglomerates in order to retain the reactor's ability to produce product gas.

For example, downdraft gasifiers use high temperature and holdup of char-ash to take advantage of the catalytic effects of the char-ash to reduce tars. Downdraft gasifiers are known to those skilled in the art as low tar-producing gasifiers due to this effect. The problem with these fixed-bed gasifiers, however, is that they can not be scaled up to very large size or large throughput units since the fixed bed of char-ash can develop preferential flow patterns (known as channeling or rat-holing) that can cause bypassing of the char-ash bed, stoppage of char-ash flow, or other problems.

Gasifier systems that employ liquid-based scrubbing of tar from product gas suffer thermodynamic efficiency losses, may create a waste water stream, may contaminate equipment with hazardous compounds, and require additional, expensive, and energy intensive unit operations to achieve a low tar concentration.

The method of the present invention addresses the shortcomings of other methods. The present invention comprises separating a first stage of gasification from a second stage of tar conversion and char-ash heating. Char-ash particles are elutriated from the first stage of gasification. These particles are most preferred to be finely divided and of a size range that enables them to move from the first stage to the second stage. By avoiding the larger particles of char-ash, the catalytic effect of char-ash is enhanced since the effect of diffusion which is expected with larger particles and which typically poses limitations on reaction rates, is reduced. The method optionally uses an external or internal heat source to provide the heat needed to convert tar. As used herein, "external" heat source means a source of energy other than the chemical energy available in the char-ash or product gas, including, but not limited to electricity, electromagnetic radiation, combustion of fuels inside or outside the char-ash heating zone boundary, thermal fluids, and so forth. One particular method of providing an internal heat source is to partially oxidize char-ash in the heating zone which, in this method, is a char-ash rich, product gas lean zone. This controlled char-ash oxidation provides the heat necessary for tar conversion while increasing production of CO and preventing combustion of hydrogen or other desirable constituents from the product gas, thereby resulting in an increase in product gas yield. In this particular method, the creation of a separate char-ash rich zone is necessary, because otherwise the product gas will tend to oxidize first and to a greater extent due to the faster kinetics of gas combustion compared to the oxidation of solid carbon in char-ash.

The present invention includes but is not limited to two stages of gasification, delivery of first stage tar-laden and char-ash laden gasification product gas to a second stage of gasification where the tars are provided adequate space, contact with char-ash, time, and temperature for conversion of tars in the product gas occurring as a result of the hold up of the char-ash, and the resulting higher char-ash/product gas ratio possible in the second stage of gasification. The second stage of gasification may be comprised of one or more zones: one or more tar conversion zone(s) where a high char-ash/product gas ratio is employed to convert tars, and optionally one or more char-ash heating zone(s) where the char-ash undergoes heating via an internal or external heat source.

In embodiments of the method that utilize char-ash heating zone(s), char-ash oxidation may be used as an internal source of heat. In this case, in the char-ash heating zone partially oxidizes char-ash which produces heat and activates the carbon at the surface of the char-ash particles. The oxidized carbon surface is expected to have an activity for tar conversion that is significantly greater than expected for a carbon surface in a reduced state, especially for the conversion of the most problematic refractory tars such as poly-aromatic hydrocarbons including naphthalene, anthracene, coronene, and so on. The carbon surface serves as a site for adsorbed oxygen and therefore can act as an oxygen transfer catalyst, which can also enhance the selectivity of tar conversion over gas-phase oxidation of CO or $H_2$, owing to the solid-phase adsorption characteristic of heavy tars being preferred over light gases. This oxygen adsorption effect may also significantly reduce the temperatures required in the tar conversion zone to achieve the desired tar conversion.

Hot, activated char-ash and product gas containing tar are contacted in the tar conversion zone(s) which allows tar conversion to occur on the surface of the char-ash. Tar-free product gas is separated from char-ash by cyclones where most of the char-ash is delivered back to the char-ash oxidation zone, and product gas exits the reactor.

In methods employing char-ash oxidation in the char-ash heating zone, the temperature in the char-ash heating zone is kept below the temperature threshold that would result in ash melting or slagging. The char-ash circulation rate in the tar conversion zone(s) should be maximized. A higher char-ash/gas ratio in the tar conversion zone(s) reduces the temperature needed to achieve beneficial rates of tar conversion. Maximizing the char-ash circulation rate increases the ratio of char-ash to oxygen in the char-ash oxidation zone, thereby increasing the yield of CO relative to carbon dioxide ($CO_2$) produced in the char-ash oxidation zone. Also, maximizing the char-ash circulation rate increases the mass rate through the char-ash heating zone, which increases the char-ash to incoming product gas ratio and thereby reduces the char-ash heating zone temperature needed to achieve the desired temperature in the tar conversion zone.

The method may be accomplished via several alternative apparatus assemblies. At its simplest, a first embodiment includes a second reactor separate from the first stage gasifier, having only a tar conversion zone. Product gas and char-ash suspended in the product gas from a separate first stage gasifier enters a char-ash heating zone and the bottom of the tar conversion zone in the second reactor; char-ash is separated from product gas after exiting the second reactor in a single or series of cyclone(s); char-ash is returned to the tar conversion zone and product gas exits the reactor.

Another embodiment includes a second reactor separate from a first stage gasifier, the second reactor having a char-ash heating zone and a tar conversion zone. Product gas and char-ash suspended in the product gas from the separate first stage gasifier enters the bottom of a tar conversion zone in the second reactor; char-ash is separated from product gas after exiting the second reactor in a single or series of cyclone(s); char-ash is returned to the char-ash heating zone via at least one standpipe for heating by external means to a desired outlet temperature. This provides heat to drive the endothermic tar conversion reactions in the tar conversion zone.

Another embodiment includes a second reactor separate from the first stage gasifier, having a char-ash heating zone and a tar conversion zone. Product gas and char-ash suspended in the product gas from a separate gasifier enters the bottom of a tar conversion zone in the second reactor; char-ash is separated from product gas after exiting the second reactor in a single or series of cyclone(s); char-ash is returned to the char-ash heating zone via at least one standpipe where an oxidizing agent is introduced and the char-ash is partially oxidized to a target outlet temperature with no oxygen in the gas exiting the char-ash oxidation zone. This provides heat to drive the endothermic tar conversion reactions in the tar conversion zone. Partial oxidation leaves the surface of the char-ash in an activated state and thus improved catalytic activity for tar conversion.

Another arrangement employs a split standpipe, where the lower leg delivers char-ash to the char-ash heating zone. The upper leg operates in a streaming flow regime and most of the product gas entrained with the char-ash solids therefore is returned to the tar conversion zone, so less entrained product gas is delivered to the char-ash heating zone. The char-ash heating zone can operate in an overflowing bubbling fluidized bed, fast fluidized bed, or entrained flow regime.

Still another embodiment employs a series of cyclones. A first cyclone or first series of cyclones recycles char-ash back to a tar conversion zone through a standpipe or series of standpipes located internally in the reactor and a second cyclone, which may be internal or external to the reactor, recycles char-ash back to the char-ash heating zone. This arrangement preferentially delivers lower carbon-content char-ash to the char-ash heating zone and may result in improved overall carbon conversion.

In another embodiment, a single vessel houses both stages of gasification (both reactors). This arrangement positions the first stage gasifier below the char-ash heating zone. The char-ash heating zone includes within it overflow standpipes for returning any entrained bed media (typically, but not limited to sand, limestone, dolomite, olivine, aluminum oxide, silicon carbide, or other granular solids) back to the first stage gasifier. Product gas and tar and char-ash from the first stage gasifier bypasses the char-ash heating zone via product gas transfer pipes which deliver them to the tar conversion zone. At the top of the tar conversion zone, internal cyclones and standpipes (char-ash standpipes) are present for delivering char-ash back to the char-ash heating zone which operates in overflowing bubbling fluidized bed regime. Char-ash disengages from product gas entrained by char-ash at the outlet of the char-ash standpipes allowing that entrained product gas to travel back up the tar conversion zone to the cyclone inlet, and allowing the char-ash to return to the oxidation zone. The char-ash oxidation zone may be operated in bubbling, turbulent or fast fluidization, or entrained flow regimes. The product gas from the first stage gasifier is blended with product gas from the char-ash heating zone; the char-ash heating zone when operated to cause partial oxidation of char-ash provides the necessary heat and activated char-ash catalyst for tar conversion reactions to take place within the tar conversion zone. This embodiment provides a broader scope of scalability than the aforementioned embodiments and is amenable to increasing the vessel diameter without detriment to good flow distribution. A smaller, shorter freeboard, or a smaller volume provided in the first reactor may be employed in this, or other embodiments which in turn, allows more vessel volume to be applied or utilized for conversion. This may lower vessel fabrication costs, but also may provide less residence time for the product gas to exist in a low char-ash/product gas ratio environment, which may reduce the extent of maturation of less refractory tars into more refractory tars.

Other modifications and embodiments also exist. For example but not for limitation, the following modifications and embodiments may be considered within the purview of this invention: swaged sections may be employed to adjust diameters, effect the desired residence times and solid holdup in the fluidized beds, riser, standpipes or other sections of the process. Heat exchangers may be added to remove from or transfer heat to: the tar conversion zone, standpipes, char-ash heating zone, or other portions of the system, which may have application for startup, shutdown, or operational conditions for enhancing selectivity, conversion, or protection of metallurgy or materials of construction. Variations in materials of construction of the vessel shell or internals and variations in refractory design are also possible and may include enhancements to enhance or reduce heat transfer, reduce erosion, corrosion, or provide other vessel shell protection or protection for internal structures. Addition of sorbents, minerals, or other catalysts to the process to enhance tar conversion or to effect stability or selectivity of the process may be used. Addition of chemicals (such as but not limited to sulfur) to the feedstock, in order to improve the life of the metallurgy of the internals or enhance catalytic activity of the char-ash can be considered. Liquids, solid or gaseous sorbent to act as getters for process contaminants may be employed to address the presence of heavy metals, toxic metals, halides or other undesired species. Finally, internals may be added to the riser section or the reactor may be inverted so that the tar conversion zone is operated in down flow mode to improve gas/solid contact and/or flow distribution by increasing solids holdup, turbulence, or by reducing the gas/solids separating effects. Many of these variations may be used as described in Wen-Chin Yang, Handbook of Fluidization and Fluid-Particle Systems, CRC Press, 2003 and/or Fluidization engineering, Chemical Engineering Series, Daizo Kunii, Octave Levenspiel, Edition 2, Publisher Butterworth-Heinemann, 1991, ISBN 0409902330, 9780409902334.

These, and other considerations, may be used in combination with or as augmentations to the present invention.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventors do regard as their invention is particularly pointed out and distinctly claimed in the claims at the conclusion of this specification.

DRAWINGS

Figure 2:
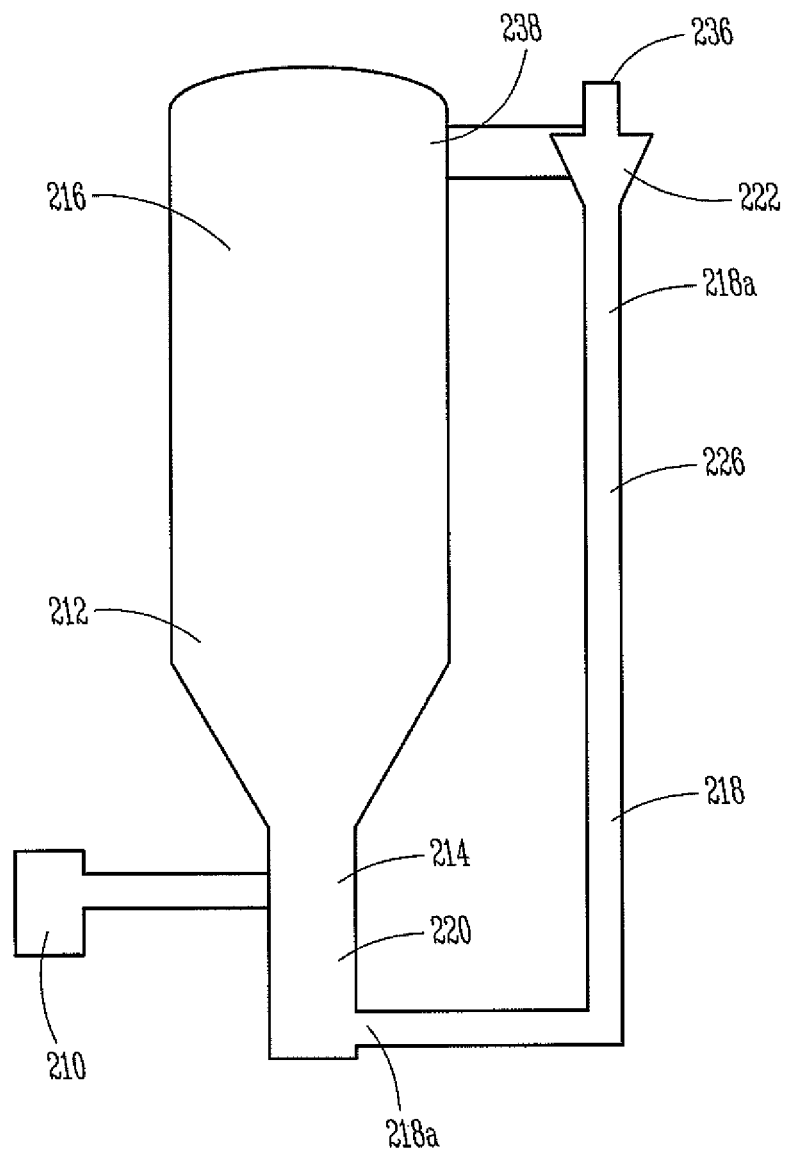
Figure 3:
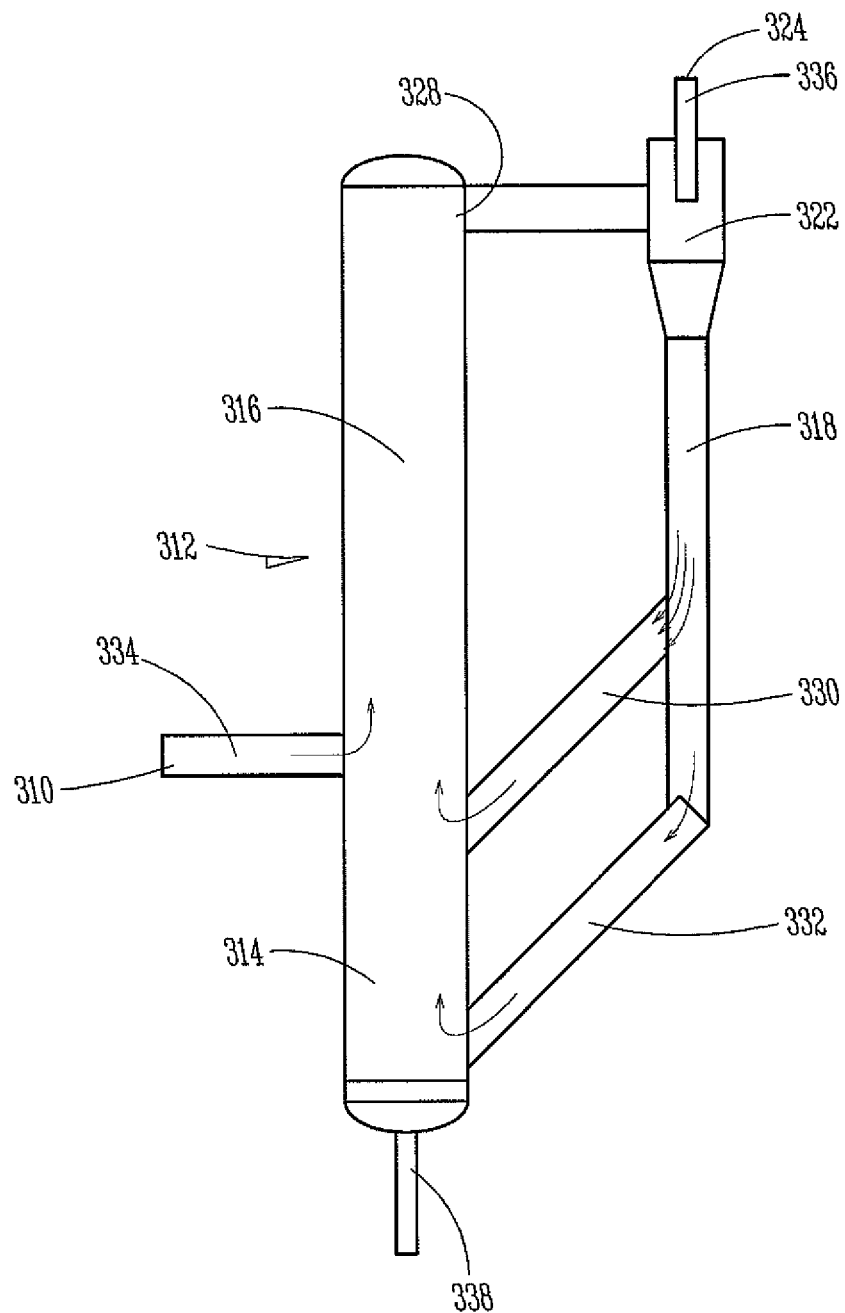
Figure 4:
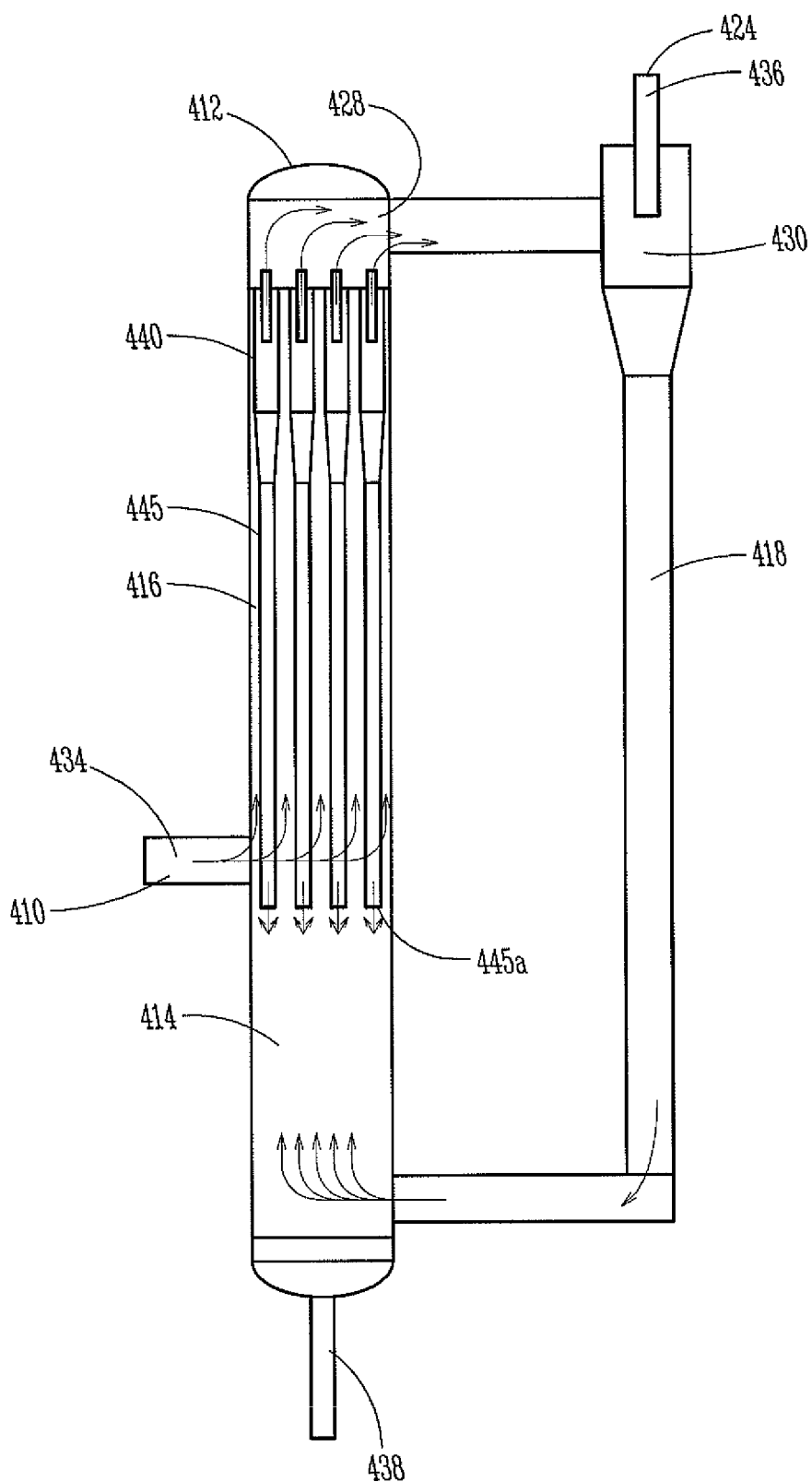
Figure 5:
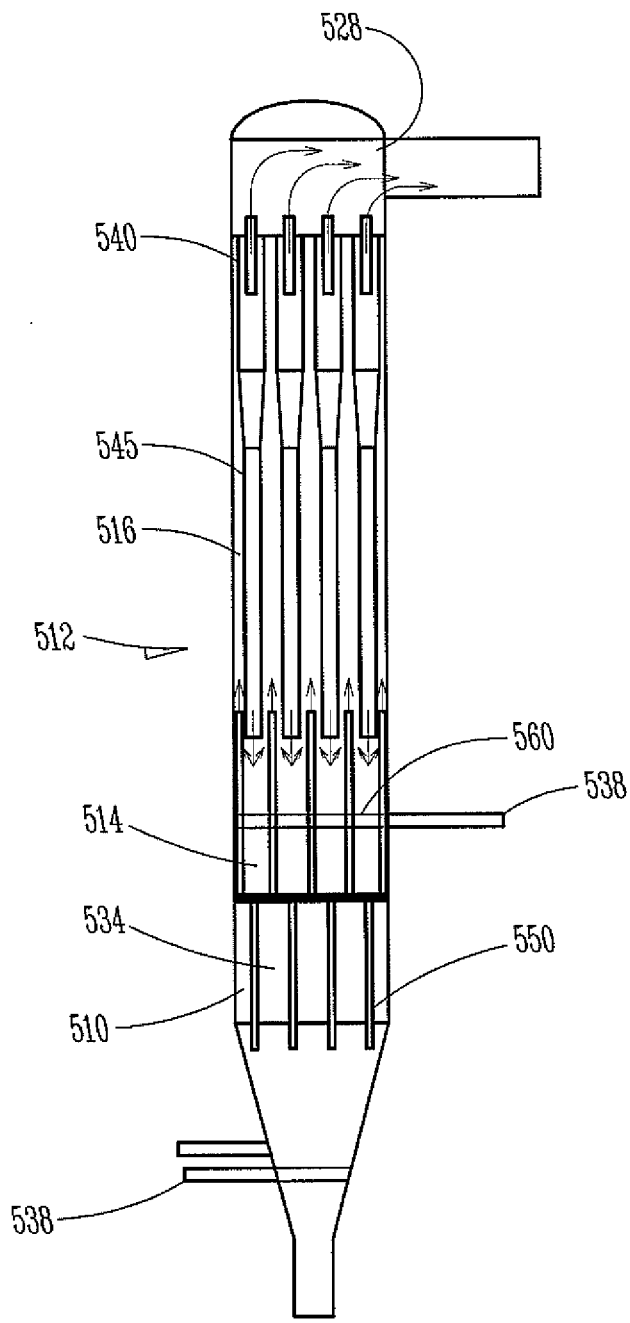

FIG. 1 a prior art gasification assembly;

FIG. 2 an embodiment of the present invention comprising a tar conversion zone, external cyclone, and standpipe in a separate reactor vessel from the first stage gasifier;

FIG. 3 an embodiment of the present invention comprising a tar conversion zone, external cyclone, and split standpipe;

FIG. 4 an embodiment of the present invention comprising a tar conversion zone, at least one internal cyclone and associated standpipe(s), and an external cyclone and associated standpipe in a separate reactor vessel; and FIG. 5 an embodiment of the present invention comprising a single vessel where both first stage gasification and second stage tar conversion reactions take place.

DETAILED DESCRIPTION OF THE INVENTION

Prior art gasification assemblies can include one or several types of gasification processes. As an example, FIG. 1 shows an apparatus that includes a vessel 1012 comprising a char-ash oxidation zone 1014 where char-ash 1020 is partially oxidized and a tar conversion zone 1016 having an exit 1028. Said exit 1028 is fluidly connected to a cyclone 1022 for separating particulates from the gas which gas is then collected. The separated particulate matter is then discarded or may be sent to the bed below the char-ash oxidation zone. Gasifiers of this nature are disclosed and described in such texts as Handbook of Biomass Gasification, edited by H. A. M. Knoef, BTG Biomass Technology Group, Krukkerij Giethoorn ten Brink, Meppel, the Netherlands, 2005, ISBN 90-810068-1-9 and Combustion and Gasification in Fluidized Beds, Prabir Basu, CRC Press, 2006, ISBN 0-8493-3396-2 and Biorenewable Resources Engineering new Products from Agriculture, Robert Brown, Iowa State Press, 2003, ISBN 0-8138-2263-7.

The present invention comprises a method for gasifying carbonaceous material, which includes two stages of gasification. Product gas and char-ash from the first stage is delivered to a second stage where it is mixed with a hot char-ash stream exiting either a char-ash oxidation zone which provides heat and char-ash with an activated carbon surface or a char-ash heating zone which provides heat. This increases catalytic action necessary for adequate tar conversion, lessens the oxidation of CO and H2 resulting in increased product gas yield, and reduces temperature required for the desired tar conversion. The method may also include any of the aforementioned augmentations.

Various apparatus assemblies may be employed. A first embodiment of such an assembly shown in FIG. 2 includes a first stage gasifier vessel 210 and a separate vessel 212 wherein said separate vessel 212 further comprises a char-ash oxidation zone 214 where char-ash 220 is partially oxidized with an oxidizer 238 (such as but not limited to air, enriched oxygen (air and oxygen mixture), or any gas containing oxygen) and a riser comprising tar conversion zone 216 having an exit 228. Said exit 228 is fluidly connected to a cyclone 22 which, in turn, is fluidly connected to a standpipe 218 having a first end 218a and a second end 218b. The second end 218b is fluidly associated with the char-ash oxidation zone 214 of the separate vessel 212. Char-ash and tar laden product gas 234 from the first stage gasifier vessel 210 enters the separate vessel 212 above the char-ash oxidation zone 214. Char-ash 220 is partially oxidized in the char-ash oxidation zone 214 and then contacts the incoming char-ash and tar laden product gas 234. Both travel up the separate vessel 212 to the exit 228 to the cyclone 222 where the char-ash laden, tar free product gas 238 exits and the separated char-ash 220 is returned through the standpipe 218 to the char-ash oxidation zone 214. While char-ash and tar laden product gas 234 and partially oxidized char-ash 220 are present in the tar conversion zone 216, tar is converted to low molecular weight product gas products by catalytic action of the char-ash 220. The conditions are such that the tar conversion reactions are selected over the gas-phase oxidation of CO or H2 thereby resulting in a higher yield of tar free product gas 238.

A second embodiment shown in FIG. 3 includes the first stage gasifier vessel 310, the separate vessel 312, the char-ash oxidation zone 314, the tar conversion zone 316 having exit 328 connected to the cyclone 322 in turn fluidly connecting to standpipe 318. Here, said standpipe 318 is split to comprise an upper leg 330 and a lower leg 332. The upper leg 330 operates in streaming flow as does the remainder of the standpipe 318 above the upper leg 330, but the lower leg 332 operates in a stick-slip or packed bed flow regime. The effect of the split standpipe 318 is to reduce the amount of entrained product gas delivered to the char-ash heating zone 314 since most of the entrained product gas going down the standpipe 318 will move through upper leg 330 and bypass the char-ash heating zone 314 and be, instead, delivered to the separate vessel 312 in the tar conversion zone 316 and, in another embodiment where char-ash is partially oxidized, avoiding contact with the oxidizer 338 in the char-ash heating zone 314.

A third embodiment in FIG. 4 includes a gasifier vessel 410, a separate vessel 412, a char-ash heating zone 414, a riser comprising a tar conversion zone 416 having an exit 428 and a first stage cyclone or a plurality of first stage cyclones 440. Said exit 428 and a second stage cyclone 430 external to the separate vessel 412 are fluidly associated with a standpipe 418. The standpipe 418 returns char-ash 20 to the char-ash heating zone 414. Char-ash laden, tar free product gas 436 is allowed to exit from the tar conversion zone 416 at exit 428. Said first stage cyclone or plurality of first stage cyclones 440 are each comprised of a solids exit via a char-ash standpipe 445, and a gas outlet fluidly connected to exit 428. Each said standpipe 445 includes an outlet 445a providing space enough for most of the char-ash 20 to disengage from any entrained char-ash laden, tar free product gas 436 that also flows down the standpipe 445, such that the entrained char-ash laden, tar free product gas 36 is allowed to go back up the tar conversion zone 416 and some of the char-ash 20 can mix into the char-ash heating zone 414. The standpipe 445 recycles char-ash 20 back to the lower portion of the tar conversion zone 416 but above the char-ash heating zone 414. The second stage cyclone 430 serves to provide improved capture efficiency of char-ash 20. Due to the lower solids loading in the second stage cyclone 430, the amount of char-ash laden, tar free product gas 436 that is entrained in the second stage standpipe 418 is reduced, such that this standpipe can operate in packed bed or stick-slip regime, reducing the amount of product gas 436 that enters the char-ash heating zone 414. Char-ash laden, tar-free product gas 436 exits the system at the product gas outlet 424.

A fourth embodiment in FIG. 5 comprises a single vessel 512 having a first stage gasifier 510, a char-ash heating zone 514 where char-ash is partially oxidized with an oxidizer 538, and a tar conversion zone 516 where tar conversion reactions take place. This embodiment is enabled by placement of two separate categories of standpipes which provide a means for char-ash 20 to be returned to the heating zone, product gas 34 from the first stage gasifier 510 to be transferred through and thus bypass the char-ash heating zone 514 and entrained bed media to be returned to the dense phase of the first stage gasifier 510. Specifically, the vessel 512 further includes one or a series of cyclones 540. Each said cyclone is comprised of a char-ash laden, tar free product gas 36 outlet fluidly connected to the vessel gas outlet 528 and to a standpipe(s) 545 for allowing char-ash 20 to be transported to the char-ash oxidation zone 514. At the outlet of the standpipe(s) 545 entrained product gas 36 is allowed to disengage from char-ash 20 to rise back through the tar conversion zone 516. The char-ash 20 from the standpipe(s) 545 mixes with the char-ash 20 in the char-ash oxidation zone 514. The vessel 512 also includes at least one or a plurality of bed media standpipes 550 for returning any entrained bed media to the first stage gasifier 510. The vessel further includes at least one or a plurality of product gas transfer pipes 560 for allowing char-ash and tar laden product gas 34 to pass directly from the first stage gasifier 510 to the tar conversion zone 516, bypassing the char-ash oxidation zone 514.

Thus, the present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced otherwise than as specifically described.

What we claim is:

1. A method for producing product gas substantially free of tar by gasification of carbonaceous material wherein said method comprises: producing char-ash and tar-laden product gas in a first stage of gasification and transporting said char-ash and tar-laden product gas from the first stage to a second stage of gasification said second stage comprising: substantial separation of char-ash from product gas arising from the second stage of gasification, recycling said char-ash from the second stage by recombining at least a portion of the separated char-ash from the second stage of gasification with the tar-laden product gas and char-ash from the first stage of gasification at an inlet of the second stage of gasification, and providing sufficient time, temperature, and char-ash concentration for tar conversion reactions to take place.

2. The method of claim 1 wherein said second stage of gasification includes heating of char-ash separated from the product gas at the outlet of the second stage of gasification to partially oxidize the char-ash before recombining it with the tar-laden gas from the first stage of gasification at the inlet of the second stage of gasification.

3. The method of claim 2 wherein said partial oxidation of said char-ash generates heat and additional product gas, and activate at least a portion of the surface of said char-ash to enhance its catalytic activity for conversion of tar to less problematic tar comprising at least one selected from a group consisting of: lower molecular weight tar, deoxygenated tar, hydrogenated tar, hydrogen, and carbon monoxide, in order to reduce at least one effect selected from the group consisting of: agglomeration, coke formation, fouling, plugging, tar condensation, and tar polymerization.

4. The method of claim 2 wherein means to supply heat for heating said char-ash comprises at least one selected from the group consisting of electricity, radiation, combustion of fuels inside the heating zone, combustion of fuels outside the heating zone, and thermal fluids.

5. An assembly for producing product gas substantially free of tar from gasification of carbonaceous material wherein said assembly comprises: a first stage gasifier for producing char-ash and tar-laden product gas, a duct for transporting said char-ash and tar-laden gas from the first stage to a second stage gasifier comprising: a cyclone for disengagement of char-ash from product gas arising from the second stage of gasification near the outlet of the second stage of gasification, a duct for transporting said char-ash to a zone for recycling said char-ash from the second stage of gasification by recombining said char-ash with the tar-laden syngas and char-ash from the first stage of gasification at the inlet of the second stage of gasification to generate additional product gas and at least partially activate a portion of the char-ash, and a zone in the second stage gasifier that provides sufficient time, temperature, and char-ash concentration for tar conversion reactions to take place.

6. The assembly of claim 5 additionally comprising a zone for heating the char-ash from the second stage of gasification, prior to recombining it with the tar-laden gas and char-ash from the first stage gasifier.

7. The assembly of claim 6 wherein heating the char-ash partially oxidizes and gasifies said char-ash producing additional product gas.

8. The assembly of claim 7 further comprising at least one cyclone for accepting said product gas and char-ash from said second stage gasifier and at least one standpipe wherein each of said cyclones separates at least some of the char-ash from the product gas and said at least one standpipe returns said char-ash to said char-ash oxidation zone.

9. The assembly of claim 5 wherein the first stage gasifier further comprises bed media and the second stage gasifier further comprises at least one bed media standpipe for returning bed media entrained with the first stage gasifier tar-laden gas and char-ash product back to said first stage gasifier.

10. The assembly of claim 5 wherein said first stage gasifier and said second stage gasifier are present in a single vessel for minimizing residence time of tar-laden gas in a low char-ash concentration environment and minimizing formation of high molecular weight refractory tars.

11. The assembly of claim 5 wherein said first stage further comprises bed media and said second stage gasifier comprises at least one bed media standpipe for returning entrained bed media to said first stage gasifier, at least one product gas transfer pipe for allowing product gas to bypass said char-ash heating zone, and an exit opening for said product gas.

12. The assembly of claim 5 wherein, a char-ash heating zone comprises further a duct for injecting a stream of gas containing oxygen; for said partial oxidation of at least a portion of said char-ash to enhance its catalytic activity for conversion of tar to at least one selected from a group consisting of: lower molecular weight tar, deoxygenated tar, hydrogenated tar, hydrogen, and carbon monoxide, in order to reduce at least one effect selected from the group consisting of: agglomeration, coke formation, fouling, plugging, tar condensation, and tar polymerization.

13. The assembly of claim 5 where the first stage gasifier is a fluidized bed reactor, the second stage gasifier comprises a bubbling bed reactor and a tar conversion zone, and the char-ash heating zone within the second stage of gasification is a fluidized bed, said assembly present in a single vessel.

* * * * *